J. RADDIN.
Carriage-Wheel.
No. 48,207.
Patented June 13, 1865.
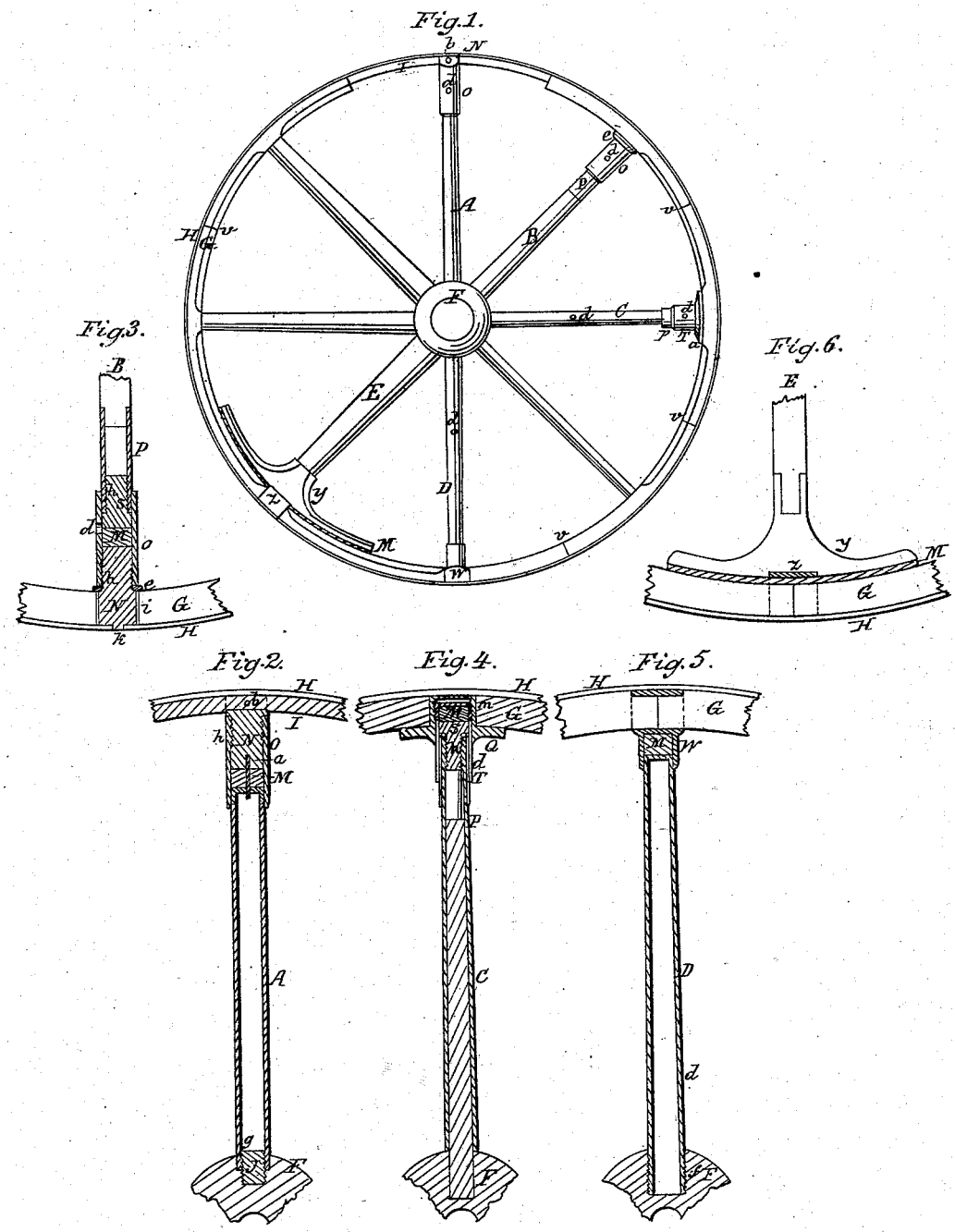
Witnesses.
N. Ames.
Samuel Green.
Inventor.
John Raddin.

UNITED STATES PATENT OFFICE.

JOHN RADDIN, OF LYNN, MASSACHUSETTS.

IMPROVEMENT IN CARRIAGE-WHEELS.

Specification forming part of Letters Patent No. 48,207, dated June 13, 1865.

*To all whom it may concern:*

Be it known that I, JOHN RADDIN, of Lynn, in the county of Essex and State of Massachusetts, have invented a new and useful Improvement in Carriage-Wheels; and I do hereby declare that the following is a full, clear, and exact description of the construction and operation of the same, reference being had to the accompanying drawings, forming a part of this specification, in which—

Figure 1 is a side elevation of one of my wheels, different spokes of which show the different modifications of the principle of my invention; and Figs. 2, 3, 4, 5, and 6 are enlarged longitudinal central sections through the different spokes, showing their internal construction and the manner in which they are connected with the other parts of a wheel.

Like parts are indicated by the same letters in all the drawings.

The nature of my invention consists, first, in rendering a wheel elastic, so as to relieve the jar and rattle in striking against or passing over stones and other hard obstructions, by applying to the end of the spokes a spring or packing of rubber or other elastic substance inclosed in a suitable box or socket; second, in so constructing the spokes with a screw at either end and so connecting them with the hub and felly that by simply turning the spokes or screws the wheel, or rather the felly, may be expanded at pleasure whenever it is required to tighten the tire, thereby saving the cost of resetting the same whenever it becomes expanded or the felly contracted; third, in placing a cushion of rubber or other suitable elastic substance between the sections of the felly, so that the diameter of the latter may be contracted without cutting the said sections or expanded without leaving an open space between them; fourth, in constructing the spokes of a carriage-wheel of metallic tubes, whereby I am enabled to obtain the requisite lightness and strength.

To enable others skilled in the art to make and use my invention, I will now proceed to describe the construction and operation of the same.

F is the hub of the wheel, which may be either of wood or metal. G is a wooden felly, and H is the tire, all constructed like those in general use.

I is one section of a metallic felly, which, if desirable, may be used instead of wood.

The spokes marked A, B, C, and D represent the different modifications of my invention as applied to a common carriage-wheel.

In Fig. 2 the spoke A is made of a hollow metallic cylinder, the hub end of which is provided with an internal screw, $g$, which receives the screw J, previously driven fast into the wooden hub F. The outer end of this cylinder is plugged or covered. N is a square-headed screw, the head of which is slotted so as to clasp the iron felly I, to which it is confined by means of a pin or screw, $b$. O is a metallic cylinder or thimble, the bore of which is just large enough to receive the end of the spoke A and the screw N. One end of this thimble O is provided with an internal screw, $h$, which fits the external screw cut on N, as seen in Fig. 2. $a$ is a small pin fast in the end of screw N, and passing freely through a hole in the center of the end of the cylinder A to form a guide for the packing M, which latter is made of rubber or other suitable elastic material, and is inclosed within the thimble O, between the ends of the screw N and cylinder A. This elastic packing is intended to relieve the jar and rattle of the wheel in passing over hard obstructions. In order to tighten the tire it is only necessary to turn the spoke A by any suitable instrument, so as to move it farther from the hub, thus avoiding the necessity and expense of resetting.

In Fig. 3 is represented a wooden spoke provided with a metallic thimble, P, into the outer end of which is screwed the round-headed plug S. N is a screw fast in a hole through the felly, the outer end of which screw is provided with a small square head, $k$, which passes through a corresponding hole in the tire and keeps the screw from turning. $i$ is a packing of gutta-percha, which may be used, if desirable, around the said screw to hold it firmly in the hole in the felly. $e$ is a washer around the screw N, next to the felly. O is a thimble, similar to O in Fig. 2, and attached to the screw N in a similar manner. M is the elastic packing, like that described in Fig. 2, and for a similar purpose. $d$ is a hole in the side of the thimble O, by means of which and a proper instrument inserted therein it may be turned toward or from the felly. By turning the screw-plug S the spoke B may be elongated and the tightening of the tire accomplished, as in Fig. 2.

In Fig. 4 is represented another modification of my invention, in which C is a common wooden spoke, having its felly end provided with a fixed metallic thimble, P, in the outer end of which is cut an internal screw, $h$, to receive the screw S, which latter is furnished with a square head, so as to be readily turned by a suitable wrench against the elastic packing M. Q is a flanged socket, the outer cylindrical portion of which passes through the felly G, while the flanged portion rests against the inner edge of the same, as clearly shown in the drawings, Fig. 4. In the cylindrical part of this socket Q are screw-threads $m$ to receive the threads cut on the end of the thimble T, the latter being provided with a side hole, $d$, similar to the hole $d$ in Fig. 3, and for a similar purpose.

Fig. 5 represents a hollow cylindrical or slightly conical metallic spoke, D, provided with an external screw, $f$, which enters an internal screw in a metallic hub, F. The felly end of this spoke D is closed and enters the cylindrical part of the socket W, the outer portion of which is provided with a thimble so shaped as to receive the contiguous ends of two sections of the felly G. M is the elastic packing, similar to that applied to the ends of the other spokes, already described, and for a similar purpose. $d$ is a hole in the side of the spoke, by means of which and a suitable instrument the spoke may be screwed outward from the hub for the purpose of tightening the tire.

In Fig. 6 is represented a modification of the application of the elastic packing, adapted more particularly for very heavy wagons, carriages, or cars, in which the outer end of the spoke E is provided with an expanded head, Y, of wood or metal, between which and the felly a long strip of elastic packing, M, is placed, Z being a metallic clamp, the bottom of which is fast to the said head, and the sides of which extend each side of the felly, as shown in Fig. 1, whereby the latter is held in place.

Between the sections of the felly G, I also propose to interpose the cushions V, of india-rubber, for the purpose specified above in setting forth the nature of my invention, the contiguous ends of said sections being made concave to keep the cushions from working out of place.

Having thus described the nature of my invention, what I claim as new, and desire to secure by Letters Patent, is—

1. The thimble O, in combination with the screw N and elastic packing M, applied to the spokes and felly of a carriage-wheel, substantially as and for the purpose described.

2. The metallic thimble P, applied to the felly end of a wooden spoke, in combination with the screw S, packing M, thimble O, and fixed screw N, substantially as shown in Fig. 3, and for the purpose described.

3. The fixed screw J, in a wooden hub, operating in combination with an internal screw cut in the end of a spoke, substantially as and for the purpose described.

4. The socket W, provided with a clasp entirely surrounding the felly, when used in combination with a spoke rendered adjustable by means of a screw, and the elastic packing M, substantially as and for the purpose specified.

5. The flanged socket Q, in combination with the adjustable screw-thimble T, and packing M, applied to the spokes and felly of a wheel, substantially as and for the purpose described.

6. The combination of a hollow metallic spoke with a thimble, O, screw N, and elastic packing M, substantially as and for the purpose described.

JOHN RADDIN.

Witnesses:
N. AMES,
SAMUEL GREEN.